United States Patent
Afanasiev et al.

(10) Patent No.: US 10,113,103 B2
(45) Date of Patent: Oct. 30, 2018

(54) POLYMER PROPPANT MATERIAL AND METHOD FOR PRODUCING SAME

(71) Applicant: OTKRYTOE AKTSYONERNOE OBSCHESTVO "ROSNEFT OIL COMPANY", Moscow (RU)

(72) Inventors: Vladimir Vladimirovich Afanasiev, Moscow (RU); Sergey Anatolievich Alkhimov, Moscow (RU); Nataliya Borisovna Bespalova, Moscow (RU); Egor Vladimirovich Shutko, Moscow (RU); Tatyana Modestovna Yumasheva, Moscow (RU); Igor Alekseevich Kiselev, Moscow (RU); Olga Vasilievna Masloboyschikova, Moscow (RU)

(73) Assignee: OTKRYTOE AKTSYONERNOE OBSCHESTVO "ROSNEFT OIL COMPANY", Moscow (RU)

( * ) Notice: Subject to any disclaimer, the term of this patent is extended or adjusted under 35 U.S.C. 154(b) by 0 days.

(21) Appl. No.: 14/786,598

(22) PCT Filed: May 13, 2014

(86) PCT No.: PCT/RU2014/000337
§ 371 (c)(1),
(2) Date: Oct. 23, 2015

(87) PCT Pub. No.: WO2014/185821
PCT Pub. Date: Nov. 20, 2014

(65) Prior Publication Data
US 2016/0075938 A1    Mar. 17, 2016

(30) Foreign Application Priority Data
May 15, 2013    (RU) ................................ 2013122087

(51) Int. Cl.
*C09K 8/80* (2006.01)
*C08G 61/08* (2006.01)
*C08F 232/08* (2006.01)

(52) U.S. Cl.
CPC .............. *C09K 8/80* (2013.01); *C08F 232/08* (2013.01); *C08G 61/08* (2013.01); *C08G 2261/418* (2013.01)

(58) Field of Classification Search
None
See application file for complete search history.

(56) References Cited

U.S. PATENT DOCUMENTS

| | | | |
|---|---|---|---|
| 4,068,718 A | 1/1978 | Cooke, Jr. et al. | |
| 4,568,660 A * | 2/1986 | Klosiewicz ............. C07C 37/20 | 502/102 |
| 4,668,645 A | 5/1987 | Khaund | |
| 7,931,087 B2 | 4/2011 | Gupta | |
| 2008/0202750 A1 | 8/2008 | Rediger et al. | |
| 2012/0145390 A1 | 6/2012 | Parse et al. | |
| 2012/0205101 A1 | 8/2012 | Pribytkov et al. | |
| 2012/0247335 A1 | 10/2012 | Stutzman et al. | |
| 2013/0045901 A1 | 2/2013 | Bicerano | |

FOREIGN PATENT DOCUMENTS

| | | |
|---|---|---|
| CA | 2907862 C | 8/2016 |
| CN | 1045267 A | 9/1990 |
| CN | 101489975 A | 7/2009 |
| EP | 0385556 A2 | 9/1990 |
| EP | 1656924 A1 | 5/2006 |
| EP | 2452958 A1 | 5/2012 |
| JP | 2012532954 A | 12/2012 |
| RU | 2386025 C1 | 4/2010 |
| RU | 2402572 C1 | 10/2010 |
| RU | 2462308 C1 | 9/2012 |
| RU | 2465286 C2 | 10/2012 |
| WO | WO-2008002066 A1 | 1/2008 |

OTHER PUBLICATIONS

The State Intellectual Property Office of the People's Republic of China First Office Action and Search Report issued in Chinese Patent Application No. 2014800228961, dated Dec. 19, 2016, [Chinese language].
The State Intellectual Property Office of the People's Republic of China First Office Action and Search Report issued in Chinese Patent Application No. 2014800228961, dated Dec. 19, 2016. [English language translation].

* cited by examiner

*Primary Examiner* — Jeffrey D Washville
(74) *Attorney, Agent, or Firm* — Mintz Levin Cohn Ferris Glovsky and Popeo, P.C.

(57) ABSTRACT

A polymer material for proppant in the form of a metathesis-radically cross-linked mixture of oligocyclopentadienes and methylcarboxy norbornene esters is obtained by mixing dicyclopentadiene with methacrylic esters and polymer stabilizers, heating the mixture to a temperature of 150-220° C., holding at said temperature for 15-360 minutes, and then cooling down to 20-50° C. A radical initiator and a catalyst are added successively to the resultant mixture of oligocyclopentadienes and methylcarboxy norbornene esters. The polymer matrix is heated to a temperature of 50-340° C., is held at this temperature for 1-360 minutes and then is cooled to room temperature. A technical result achieved by implementation of the present invention is an increase in thermal strength of the proppant material, providing a compressive strength of at least 150 MPa at a temperature of not less than 100° C.

6 Claims, No Drawings

POLYMER PROPPANT MATERIAL AND METHOD FOR PRODUCING SAME

This application is a U.S. national-phase entry of Patent Cooperation Treaty Application No. PCT/RU2014/000337, which has an international filing date of May 13, 2014, and claims the priority of Russian Patent Application No. 2013122087, filed May 15, 2013. The specifications, claims, and figures of both the PCT and Russian applications are incorporated herein by reference in their entireties.

FIELD OF THE INVENTION

The present invention relates to the chemistry of high-molecular weight compounds, namely to polymer materials with the increased requirements for physical and mechanical properties, in particular for the manufacture of proppants, i.e., propping pellets used in oil and gas production processes by hydraulic fracturing of formation.

BACKGROUND ART

A method of hydraulic fracturing of formation (HFF) consists in high pressure pumping a fluid into oil- and gas-bearing formations, thus facilitating the creation of fractures in the formation through which the oil or gas is flowing. To prevent the fracture healing, hard particles, generally, spherical pellets/granules called as proppants that fill the created fractures together with the carrier fluid, are admixed into the fluid being pumped. The proppants should withstand high formation pressures, be resistive to aggressive environments, and retain the physical and mechanical properties at high temperatures. Meanwhile, the proppant should have a density close to the carrier fluid density in order to be present in the fluid in suspended state and to be delivered to most remote fracture sites. Taking into account that water is most frequently used as the fluid for hydraulic fracturing, the proppant density should be close to the water density.

Mineral materials of the natural origin, such as bauxites, kaolins and sands, are frequently used as an initial material for the production of proppants (U.S. Pat. Nos. 4,068,718 and 4,668,645).

It is known to use various materials, such as a borosilicate or calcinated glass, ferrous and non-ferrous metals or alloys thereof, metal oxides, oxides, nitrides and carbides of silicon, for the production of proppants having a shape of hollow pellets (US patent application No. 2012/0145390).

Disadvantages of these materials are a high technological complexity of production of the hollow pellets therefrom, their insufficient compression strength due to the hollow structure and the material fragility, a high degree of proppant breakdown in fractures, and a reverse carry-over of particles and their fragments.

Technical solutions for the production of proppants with a polymeric coating are aimed at the removal of such disadvantages. Such cover works as a compensator of point stresses, thereby more uniformly distributing the pressure throughout the proppant surface and volume, and, moreover, reduces the average proppant density. Widely known is the use of various organic polymeric and non-organic proppant coatings in the form of epoxy and phenol resins (US patent applications Nos. 2012/0205101, 2012/247335).

Disadvantages of these technical solutions are the complexity of producing such proppants, insufficient thermal resistance of the coatings, low ovality and sphericity factors due to the shape of mineral proppant core, and a high spread of physical and mechanical characteristics.

It is known to use a wide spectrum of thermosetting polymers with cross-linkages such as epoxy, vinyl and phenol compounds, polyurethane, polyester, melamine, etc., as the material for producing proppants (US patent application No. 2013/0045901).

Known is the use of polyamide as the material for producing proppants (U.S. Pat. No. 7,931,087).

A disadvantage of the known materials is an inconformity of physical and mechanical properties of these materials simultaneously with the entire combination of requirements applicable to proppant materials. For instance, this is referred to an insufficient resistance to aggressive environments, an insufficient thermal resistance and thermal strength, degree of swelling in liquid hydrocarbons media, compression strength.

A closest technical solution to the proposed one is the use of polydicyclopentadiene as the material for proppant (RU patent No. 2386025).

Disadvantage of the use of polydicyclopentadiene is an insufficient temperature resistance and compression strength.

DISCLOSURE OF THE INVENTION

An objective of the present invention is to obtain a material that possesses the entire complex of properties required for proppants operating in heavy conditions.

A technical result achieved by implementation of the present invention is an increase in thermal strength of the proppant material providing for a compression strength of at least 150 MPa at a temperature of not less than 100° C.

The technical result is achieved by that the proppant material is a metathesis-radically cross-linked mixture of oligocyclopentadienes and methylcarboxy norbornene esters.

The technical result is also achieved by a method for producing said material, which method includes producing a mixture of oligocyclopentadienes and methylcarboxy norbornene esters by mixing dicyclopentadiene with methacrylic esters and with polymer stabilizers as which the following compounds are used (note that the relevant abbreviations are indicated in round parenthesis after each compound name): tetrakis[methylene(3,5-di-tert-butyl-4-hydroxyhydrocynnamate)]methane (1010), 2,6-di-tert-butyl-4-(dimethylamino)phenol (703), 1,3,5-trimethyl-2,4,6-tris(3,5-di-tert-butyl-4-hydroxybenzyl)benzene (330), tris(4-tert-butyl-3-hydroxy-2,6-dimethylbenzyl)isocyanurate (14), 3,5-di-tert-butyl-4-hydroxyanisole (354), 4,4'-methylene-bis(2,6-di-tert-butylphenol) (702), diphenylamine (DPA), para-di-tert-butylphenylenediamine (5057), N,N'-diphenyl-1,4-phenylenediamine (DPPD), tris(2,4-di-tert-butylphenyl)phosphite (168), tris(nonylphenyl)phosphite (TNPP), bis(2,2,6,6-tetramethyl-4-piperidinyl)sebacate (770), bis(1-octyloxy-2,2,6,6-tetramethyl-4-piperidinyl)sebacate (123), bis(1-methyl-2,2,6,6-tetramethyl-4-piperidinyl)sebacate (292), 2-tert-butyl- 6-(5-chloro-2H-benzotriazol-2-yl)-4-methylphenol (327), 2-(2H-benzotriazol-2-yl)-4,6-bis(1-methyl-1-phenyl)phenol (234); heating the initial mixture up to a temperature of 150-220° C. and holding at this temperature for 15-360 minutes, followed by cooling down to 20-50° C.; successively introducing, into the resultant mixture of oligocyclopentadienes and methylcarboxy norbornene esters, a radical initiator as which the following compounds or mixtures thereof are used (note that the relevant abbreviations are indicated in round parenthesis after each compound name): di-tert-butyl peroxide (B), dicumyl peroxide (BC-FF), 2,3-dimethyl-2,3-diphenylbutane (30), triphenylmethane (TPM), and a catalyst as which a compound of the following general formula is used:
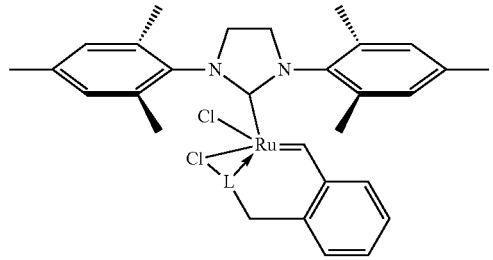
where a substituent L is selected from the following group:
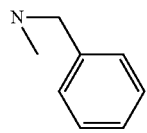
N
N1
N2
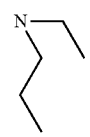
N3
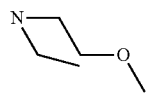
N4
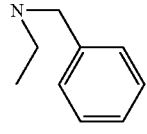
N5
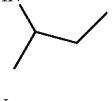
N5b
N1a
N6a
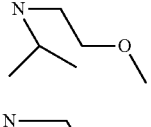
N11a
-continued
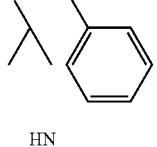
N16a
N1b
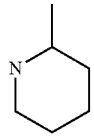
N2a
N7a
N12a
N17a
N2b
N3a
N8a
N13a
N18a
N3b
N4a

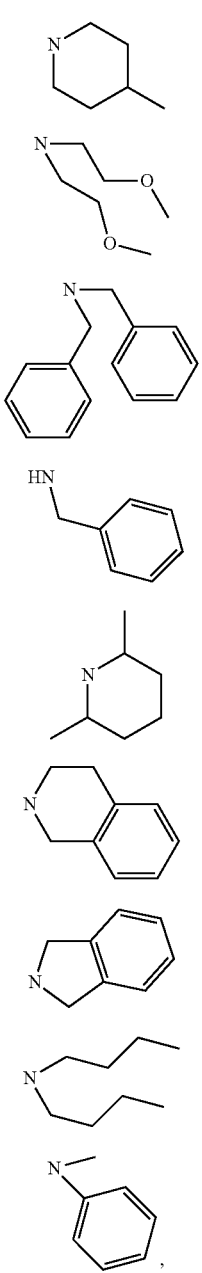

the polymeric matrix produced is heated up to a temperature of 50-340° C. and is held at this temperature for 1-360 minutes, and thereafter is cooled down to room temperature.

The following compounds or mixtures thereof are used as the methacrylic esters (note that the relevant abbreviations are indicated in round parenthesis after each compound name): allyl methacrylate (AMA), glycidyl methacrylate (GMA), ethylene glycol dimethacrylate (EGDMA), diethylene glycol dimethacrylate (DEGDMA), butylene glycol dimethacrylate (BGDMA), 2-hydroxyethyl methacrylate (HEMA), 2-hydroxypropyl methacrylate (HPMA), tricyclodecane dimethanol dimethacrylate (TCDDMA), ethoxylated bisphenol A dimethacrylate (E2BADMA), trimethylolpropane trimethacrylate (TMPTMA).

Further, the components of the polymeric matrix are present in the following amounts, wt. %:
the polymer stabilizers: 0.1-3;
the radical initiators: 0.1-4;
the catalyst: 0.002-0.02;
the mixture of oligocyclopentadienes and methylcarboxy norbornene esters being the balance.

The above-mentioned characteristic features are essential. The polymer material made of metathesis-radically cross-linked mixture of oligocyclopentadienes and methylcarboxy norbornene esters produced by simultaneously using the metathesis catalysts and radical initiators has a considerably greater glass transition temperature exceeding 340° C. and better mechanical characteristics in comparison to polydicyclopentadiene having a glass transition temperature not greater than 170° C., a compression strength of no more than 80 MPa, swelling in oil of 10-40%. For several metathesis-radically cross-linked samples, the glass transition temperature exceeds 350° C. and cannot be determined as far as it approaches to the polymer destruction onset temperature; the compression strength increases up to 260 MPa. A value of linear thermal expansion ratio decreases. The resistance to organic solvents is an extremely important property and, upon holding for a week at 100° C. for several samples of the present material, the oil swelling percentage does not exceed 1%. In comparison with polydicyclopentadiene, the said material has a considerably greater compression strength at high temperatures, which is especially important for the proppant production.

BEST MODE FOR CARRYING OUT THE INVENTION

Dicyclopentadiene (DCPD) is mixed with methacrylic esters and polymer stabilizers, and an oligomerization of the dicyclopentadiene is performed in presence of the methacrylic esters (1-30 wt. %) and the polymer stabilizers (0.1-3 wt. %) at a temperature of 150-220° C. for 5-360 minutes. The following compounds or mixtures thereof are used as the methacrylic esters: allyl methacrylate (AMA), glycidyl methacrylate (GMA), ethylene glycol dimethacrylate (EGDMA), diethylene glycol dimethacrylate (DEGDMA), butylene glycol dimethacrylate (BGDMA), 2-hydroxyethyl methacrylate (HEMA), 2-hydroxypropyl methacrylate (HPMA), tricyclodecane dimethanol dimethacrylate (TCDDMA), ethoxylated bisphenol A dimethacrylate (E2BADMA), trimethylolpropane trimethacrylate (TMPTMA). The process is run by two directions: oligomerization of dicyclopentadiene (DCPD) and an interaction of methacrylate with cyclopentadiene (CP), i.e.:

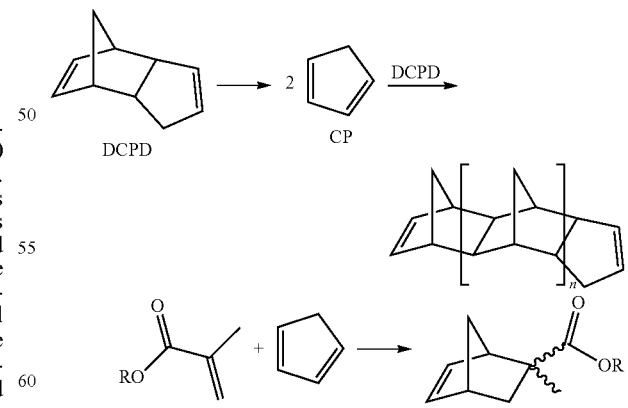

As a result, a mixture of oligocyclopentadienes (OCPD) containing trimers and tetramers of cyclopentadiene, and of methylcarboxy norbornene esters obtained in result of bonding the dicyclopentadiene with the methacrylic esters is obtained.

Radical initiators (0.1-4 wt. %) and a catalyst (0.002-0.02 wt. %) by the total matrix weight are successively introduced into this mixture. The process of metathesis-radically cross-linking the matrix is carried out at a temperature of 50-340° C. for 5-360 minutes. The metathesis polymerization (PM) and radical polymerization (RP) cross-linking the mixture of oligocyclopentadienes with methylcarboxy norbornene esters occurs according to the following scheme:

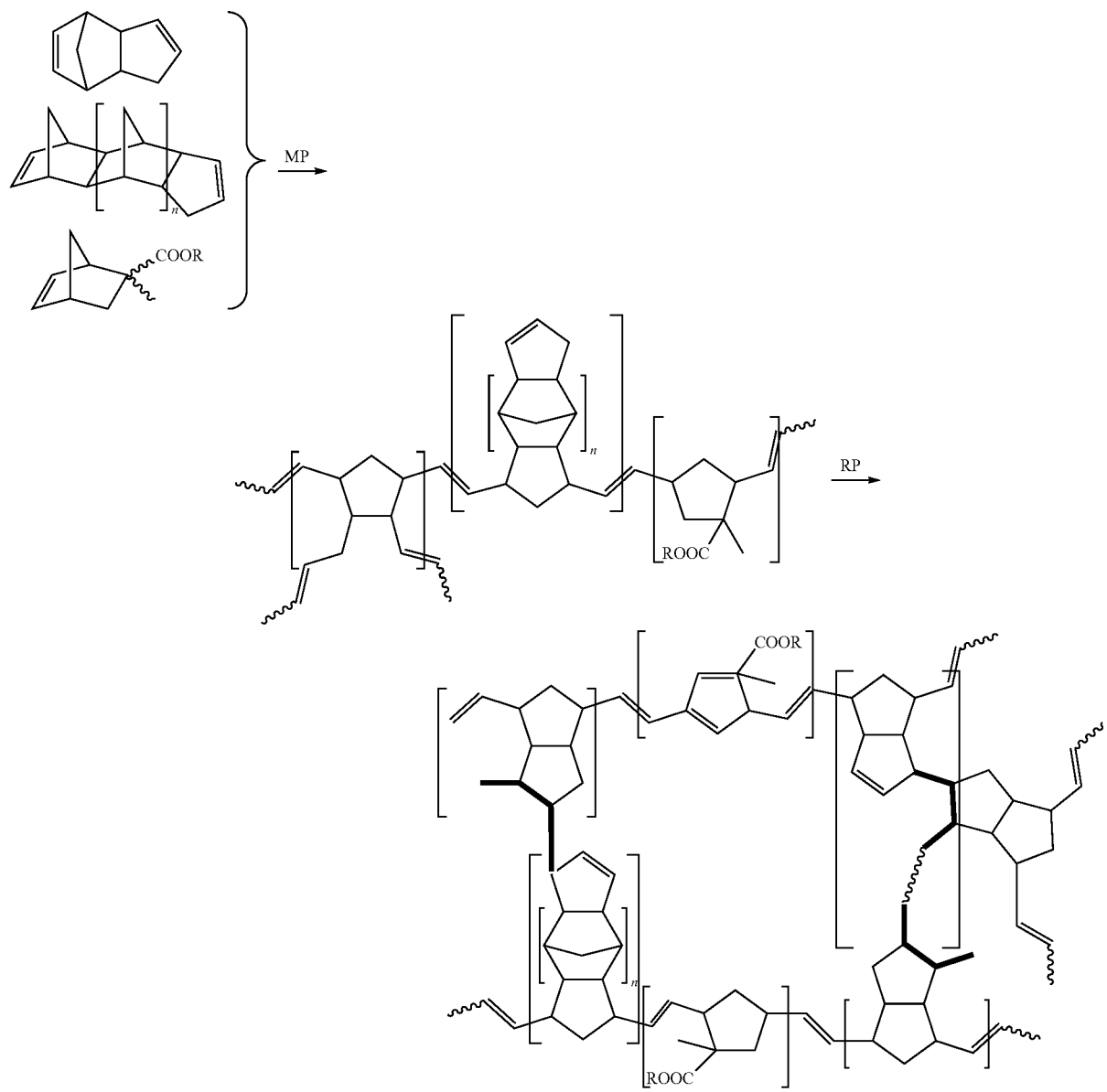

As a result, the material that is classified according to the following parameters is obtained:

Glass transition temperature (Tg)
A: more than 250° C.
B: 201 to 250° C.
C: 170 to 200° C.
D: less than 170° C.
Compression strength, MPa
A: more than 250
B: 170 to 249
C: 120 to 169
D: less than 120
Swelling in oil (100° C./ 1 week)
A: less than 1%
B: 1.1 to 3%
C: 3.1 to 5%
D: more than 5%.

EXAMPLES

Example 1

In a separate vessel, a solution containing dicyclopentadiene, polymer stabilizers 1010 (0.30 wt. %), 168 (0.40 wt. %) and 770 (0.40 wt. %), and methacrylates GMA (2.00 wt. %) and EGDMA (5.0 wt. %) is prepared. The mixture is heated in an autoclave to 150° C., is held at the specified temperature for 180 minutes, and is cooled down to room temperature. Radical initiator BC-FF (2.0 wt. %) is introduced into the mixture obtained. Catalyst N2a (0.0160 wt. %) is introduced at 30° C., and the mixture is stirred for 20 minutes, is heated to a temperature of 250° C. and is held at this temperature for 30 minutes, and thereafter is cooled down to room temperature. As a result, a hard material is obtained that is characterized by the following parameters: Tg (B), compression strength (A) and swelling (B).

Example 2

In a separate vessel, a solution containing dicyclopentadiene, polymer stabilizers 702 (0.50 wt. %), 168 (0.50 wt. %) and 770 (0.50 wt. %), and methacrylate EGDMA (2.00 wt. %) is prepared. The mixture is heated in an autoclave to 160° C., is held at the specified temperature for 180 minutes, and is cooled down to room temperature. Radical initiator B (0.1 wt. %) is introduced into the mixture obtained. Catalyst N (0.0093 wt. %) is introduced at 35° C. The mixture obtained is stirred for 40 minutes, is heated up to a temperature of 200° C. and is held at this temperature for 30 minutes, and thereafter is cooled down to room temperature. As a result, a hard material is obtained that is characterized by the following parameters: Tg (C), compression strength (A) and swelling (C).

Example 3

In a separate vessel, a solution containing dicyclopentadiene, polymer stabilizers 330 (0.50 wt. %) and 168 (0.50 wt. %), and methacrylates HEMA (2.0 wt. %) and GMA (3.0 wt. %) is prepared. The mixture is heated in an autoclave to 155° C., is held at the specified temperature for 240 minutes, and is cooled down to room temperature. Radical initiator BC-FF (1.5 wt. %) is introduced into the mixture obtained. Catalyst N7a (0.0070 wt. %) is introduced at 25° C. The mixture obtained is stirred for 10 minutes, is heated to a temperature of 150° C. and is held at this temperature for 120 minutes, and thereafter is cooled down to room temperature. As a result, a hard material is obtained that is characterized by the following parameters: Tg (C), compression strength (B) and swelling (B).

Example 4

In a separate vessel, a solution containing dicyclopentadiene, polymer stabilizers 1010 (0.02 wt. %), 168 (0.04 wt. %) and 770 (0.04 wt. %), and methacrylates EGDMA (2.00 wt. %) and TMPTMA (5.0 wt. %) is prepared. The mixture is heated in an autoclave to 150° C., is held at the specified temperature for 160 minutes, and is cooled down to room temperature. Radical initiator B (1.0 wt. %) is introduced into the mixture obtained. Catalyst N1 (0.0094 wt. %) is introduced at 50° C. The mixture obtained is stirred for 5 minutes, is heated up to a temperature of 200° C. and is held at this temperature for 360 minutes, and thereafter is cooled down to room temperature. As a result, a hard material is obtained that is characterized by the following parameters: Tg (C), compression strength (B) and swelling (B).

Example 5

In a separate vessel, a solution containing dicyclopentadiene, polymer stabilizers 1010 (0.40 wt. %) and 168 (0.40 wt. %), and methacrylate TMPTMA (2.00 wt. %) is prepared. The mixture is heated in an autoclave to 170° C., is held at the specified temperature for 180 minutes, and is cooled down to room temperature. Radical initiators BC-FF (1.0 wt. %) and 30 (2.0 wt. %) are introduced into the mixture obtained. Catalyst N2 (0.0121 wt. %) is introduced at 25° C. The mixture obtained is stirred for 10 minutes, is heated up to a temperature of 270° C. and is held at this temperature for 45 minutes, and thereafter is cooled down to room temperature. As a result, a hard material is obtained that is characterized by the following parameters: Tg (C), compression strength (A) and swelling (A).

Example 6

In a separate vessel, a solution containing dicyclopentadiene, polymer stabilizers 1010 (0.40 wt. %), 168 (0.80 wt. %) and 770 (0.40 wt. %), and methacrylate TMPTMA (2.00 wt. %) is prepared. The mixture is heated in an autoclave to 160° C., is held at the specified temperature for 180 minutes, and is cooled down to room temperature. Radical initiators BC-FF (1.5 wt. %) and 30 (2.5 wt. %) are introduced into the mixture obtained. Catalyst N14a (0.0086 wt. %) is introduced at 25° C. The mixture obtained is stirred for 10 minutes, is heated up to a temperature of 260° C. and is held at this temperature for 60 minutes, and thereafter is cooled down to room temperature. As a result, a hard material is obtained that is characterized by the following parameters: Tg (A), compression strength (A) and swelling (A).

Example 7

In a separate vessel, a solution containing dicyclopentadiene, polymer stabilizers 702 (0.30 wt. %) and 168 (0.50 wt. %), and methacrylate EGDMA (3.00 wt. %) is prepared. The mixture is heated in an autoclave to 150° C., is held at the specified temperature for 60 minutes, and is cooled down to room temperature. Radical initiator B (0.5 wt. %) is introduced into the mixture obtained. Catalyst N4 (0.0165 wt. %) is introduced at 25° C. The mixture obtained is stirred for 10 minutes, is heated up to a temperature of 150° C. and is held at this temperature for 30 minutes, and thereafter is cooled down to room temperature. As a result, a hard material is obtained that is characterized by the following parameters: Tg (C), compression strength (B) and swelling (C).

Example 8

In a separate vessel, a solution containing dicyclopentadiene, polymer stabilizers 330 (0.20 wt. %), 168 (0.50 wt. %) and 770 (0.50 wt. %), and methacrylates EGDMA (4.50 wt. %) and GMA (3.0 wt. %) is prepared. The mixture is heated in an autoclave to 160° C., is held at the specified temperature for 120 minutes, and is cooled down to room temperature. Radical initiator BC-FF (1.0 wt. %) is introduced into the mixture obtained. Catalyst N5 (0.0118 wt. %) is introduced at 10° C. The mixture obtained is stirred for 5 minutes, is heated up to a temperature of 200° C. and is held at this temperature for 30 minutes, and thereafter is cooled down to room temperature. As a result, a hard material is obtained that is characterized by the following parameters: Tg (C), compression strength (B) and swelling (B).

Example 9

In a separate vessel, a solution containing dicyclopentadiene, polymer stabilizers 702 (0.20 wt. %), 168 (0.50 wt. %) and 123 (0.50 wt. %), and methacrylate TCDDMA (30.00 wt. %) is prepared. The mixture is heated in an autoclave to 160° C., is held at the specified temperature for 120 minutes, and is cooled down to room temperature. Radical initiator BC-FF (1.0 wt. %) is introduced into the mixture obtained. Catalyst N15a (0.0104 wt. %) is introduced at 25° C. The mixture obtained is stirred for 10 minutes, is heated up to a temperature of 170° C. and is held at this temperature for 30 minutes, and thereafter is cooled down to room temperature. As a result, a hard material is obtained that is characterized by the following parameters: Tg (C), compression strength (A) and swelling (C).

Example 10

In a separate vessel, a solution containing dicyclopentadiene, polymer stabilizers 702 (0.10 wt. %), and methacrylate BGDMA (5.00 wt. %) is prepared. The mixture is heated in an autoclave to 160° C., is held at the specified temperature for 120 minutes, and is cooled down to room temperature. Radical initiators BC-FF (0.1 wt. %), 30 (1.5 wt. %) are introduced into the mixture obtained. Catalyst N1 (0.0032 wt. %) is introduced at 30° C. The mixture obtained is stirred for 10 minutes, is heated up to a temperature of 280° C. and is held at this temperature for 1 minute, and thereafter is cooled down to room temperature. As a result, a hard material is obtained that is characterized by the following parameters: Tg (A), compression strength (B) and swelling (A).

Example 11

In a separate vessel, a solution containing dicyclopentadiene, polymer stabilizers 1010 (1.50 wt. %), TNPP (1.00 wt. %) and 123 (1.50 wt. %), and methacrylate TCDDMA (12.00 wt. %) is prepared. The mixture is heated in an autoclave to 170° C., is held at the specified temperature for 60 minutes, and is cooled down to room temperature. Radical initiators B (2.0 wt. %), 30 (2.0 wt. %) are introduced into the mixture obtained. Catalyst N3a (0.0236 wt. %) is introduced at 25° C. The mixture obtained is stirred for 10 minutes, is heated up to a temperature of 260° C. and is held at this temperature for 40 minute, and thereafter is cooled down to room temperature. As a result, a hard material is obtained that is characterized by the following parameters: Tg (A), compression strength (B) and swelling (A).

Example 12

In a separate vessel, a solution containing dicyclopentadiene, polymer stabilizers DPA (0.40 wt. %), 168 (0.50 wt. %) and 234 (0.20 wt. %), and methacrylate E2BADMA (0.75 wt. %) is prepared. The mixture is heated in an autoclave to 150° C., is held at the specified temperature for 60 minutes, and is cooled down to room temperature. Radical initiator B (1.0 wt. %) is introduced into the mixture obtained. Catalyst N5a (0.0130 wt. %) is introduced at 10° C. The mixture obtained is stirred for 2 minutes, is heated up to a temperature of 200° C. and is held at this temperature for 30 minutes, and thereafter is cooled down to room temperature. As a result, a hard material is obtained that is characterized by the following parameters: Tg (C), compression strength (A) and swelling (C).

Example 13

In a separate vessel, a solution containing dicyclopentadiene, polymer stabilizers 1010 (0.20 wt. %), 168 (0.50 wt. %) and 292 (0.50 wt. %), and methacrylate TMPTMA (6.00 wt. %) is prepared. The mixture is heated in an autoclave to 180° C., is held at the specified temperature for 60 minutes, and is cooled down to room temperature. Radical initiator 30 (3.0 wt. %) is introduced into the mixture obtained. Catalyst N19a (0.0235 wt. %) is introduced at 0° C. The mixture obtained is stirred for 1 minute, is heated up to a temperature of 275° C. and is held at this temperature for 60 minutes, and thereafter is cooled down to room temperature. As a result, a hard material is obtained that is characterized by the following parameters: Tg (A), compression strength (B) and swelling (A).

Example 14

In a separate vessel, a solution containing dicyclopentadiene, polymer stabilizers 1010 (0.50 wt. %) and 168 (0.50 wt. %), and methacrylates GMA (2.50 wt. %) and HPMA (3.0 wt. %) is prepared. The mixture is heated in an autoclave to 150° C., is held at the specified temperature for 60 minutes, and is cooled down to room temperature. Radical initiators B (1.0 wt. %) and 30 (1.0 wt. %) are introduced into the mixture obtained. Catalyst N6a (0.0058 wt. %) is introduced at 25° C. The mixture obtained is stirred for 10 minutes, is heated up to a temperature of 300° C. and is held at this temperature for 30 minutes, and thereafter is cooled down to room temperature. As a result, a hard material is obtained that is characterized by the following parameters: Tg (A), compression strength (B) and swelling (A).

Example 15

In a separate vessel, a solution containing dicyclopentadiene, polymer stabilizers 1010 (0.40 wt. %), TNPP (0.40 wt. %) and 770 (0.40 wt. %), and methacrylate EGDMA (0.50 wt. %) is prepared. The mixture is heated in an autoclave to 200° C., is held at the specified temperature for 60 minutes, and is cooled down to room temperature. Radical initiator BC-FF (1.0 wt. %) is introduced into the mixture obtained. Catalyst N8a (0.0103 wt. %) is introduced at 25° C. The mixture obtained is stirred for 10 minutes, is heated up to a temperature of 170° C. and is held at this temperature for 240 minutes, and thereafter is cooled down to room temperature. As a result, a hard material is obtained that is characterized by the following parameters: Tg (C), compression strength (A) and swelling (B).

Example 16

In a separate vessel, a solution containing dicyclopentadiene, polymer stabilizers 168 (0.40 wt. %), 168 (0.40 wt. %) and 770 (0.40 wt. %), and methacrylate E2BADMA (12.00 wt. %) is prepared. The mixture is heated in an autoclave to 150° C., is held at the specified temperature for 240 minutes, and is cooled down to room temperature. Radical initiators BC-FF (1.0 wt. %) and TPM (1.0 wt. %) are introduced into the mixture obtained. Catalyst N10a (0.0063 wt. %) is introduced at 5° C. The mixture obtained is stirred for 10 minutes, is heated up to a temperature of 270° C. and is held at this temperature for 30 minutes, and thereafter is cooled down to room temperature. As a result, a hard material is obtained that is characterized by the following parameters: Tg (C), compression strength (A) and swelling (B).

Example 17

In a separate vessel, a solution containing dicyclopentadiene, polymer stabilizers 1010 (0.45 wt. %) and 168 (0.45 wt. %), and methacrylates TCDDMA (8.00 wt. %) and TMPTMA (5.0 wt. %) is prepared. The mixture is heated in an autoclave to 180° C., is held at the specified temperature for 360 minutes, and is cooled down to room temperature. Radical initiator BC-FF (2.5 wt. %) is introduced into the mixture obtained. Catalyst N9a (0.0023 wt. %) is introduced at 15° C. The mixture obtained is stirred for 10 minutes, is heated up to a temperature of 170° C. and is held at this temperature for 30 minutes, and thereafter is cooled down to room temperature. As a result, a hard material is obtained that is characterized by the following parameters: Tg (C), compression strength (B) and swelling (B).

Example 18

In a separate vessel, a solution containing dicyclopentadiene, polymer stabilizers 702 (0.45 wt. %) and 168 (0.45 wt. %), and methacrylate EGDMA (2.00 wt. %) is prepared. The mixture is heated in an autoclave to 160° C., is held at the specified temperature for 160 minutes, and is cooled down to room temperature. Radical initiator BC-FF (0.5 wt. %) is introduced into the mixture obtained. Catalyst N11a (0.0100 wt. %) is introduced at 25° C. The mixture obtained is stirred for 10 minutes, is heated up to a temperature of 200° C. and is held at this temperature for 60 minutes, and thereafter is cooled down to room temperature. As a result, a hard material is obtained that is characterized by the following parameters: Tg (C), compression strength (B) and swelling (C).

Example 19

In a separate vessel, a solution containing dicyclopentadiene, polymer stabilizers 168 (0.36 wt. %), 168 (0.72 wt. %) and 123 (0.45 wt. %), and methacrylate EGDMA (2.50 wt. %) is prepared. The mixture is heated in an autoclave to 190° C., is held at the specified temperature for 50 minutes, and is cooled down to room temperature. Radical initiator 30 (2.0 wt. %) is introduced into the mixture obtained. Catalyst N3b (0.0071 wt. %) is introduced at 30° C. The mixture obtained is stirred for 10 minutes, is heated up to a temperature of 255° C. and is held at this temperature for 30 minutes, and thereafter is cooled down to room temperature. As a result, a hard material is obtained that is characterized by the following parameters: Tg (A), compression strength (B) and swelling (A).

Example 20

In a separate vessel, a solution containing dicyclopentadiene, polymer stabilizers 1010 (0.35 wt. %), 327 (0.20 wt. %) and 770 (0.50 wt. %), and methacrylates EGDMA (2.20 wt. %) and E2BADMA (15.0 wt. %) is prepared. The mixture is heated in an autoclave to 160° C., is held at the specified temperature for 180 minutes, and is cooled down to room temperature. Radical initiators B (0.1 wt. %) and 30 (2.0 wt. %) are introduced into the mixture obtained. Catalyst N12a (0.0081 wt. %) is introduced at 25° C. The mixture obtained is stirred for 10 minutes, is heated up to a temperature of 270° C. and is held at this temperature for 30 minutes, and thereafter is cooled down to room temperature. As a result, a hard material is obtained that is characterized by the following parameters: Tg (A), compression strength (B) and swelling (A).

Example 21

In a separate vessel, a solution containing dicyclopentadiene, polymer stabilizers 1010 (0.50 wt. %) and 168 (0.50 wt. %), and methacrylate EGDMA (4.00 wt. %) is prepared. The mixture is heated in an autoclave to 155° C., is held at the specified temperature for 180 minutes, and is cooled down to room temperature. Radical initiator B (0.1 wt. %) is introduced into the mixture obtained. Catalyst N3 (0.0094 wt. %) is introduced at 25° C. The mixture obtained is stirred for 10 minutes, is heated up to a temperature of 180° C. and is held at this temperature for 120 minutes, and thereafter is cooled down to room temperature. As a result, a hard material is obtained that is characterized by the following parameters: Tg (C), compression strength (B) and swelling (C).

Example 22

In a separate vessel, a solution containing dicyclopentadiene, polymer stabilizers 330 (0.45 wt. %), TNPP (0.45 wt. %) and 292 (0.45 wt. %), and methacrylate BGDMA (10.0 wt. %) is prepared. The mixture is heated in an autoclave to 175° C., is held at the specified temperature for 180 minutes, and is cooled down to room temperature. Radical initiator B (1.0 wt. %) is introduced into the mixture obtained. Catalyst N13a (0.0104 wt. %) is introduced at 25° C. The mixture obtained is stirred for 10 minutes, is heated up to a temperature of 220° C. and is held at this temperature for 30 minutes, and thereafter is cooled down to room temperature. As a result, a hard material is obtained that is characterized by the following parameters: Tg (B), compression strength (A) and swelling (B).

Example 23

In a separate vessel, a solution containing dicyclopentadiene, polymer stabilizers 1010 (0.20 wt. %) and TNPP (0.50 wt. %), and methacrylates DEGDMA (1.50 wt. %) and E2BADMA (5.0 wt. %) is prepared. The mixture is heated in an autoclave to 150° C., is held at the specified temperature for 60 minutes, and is cooled down to room temperature. Radical initiators BC-FF (1.0 wt. %) and 30 (2.0 wt. %) are introduced into the mixture obtained. Catalyst N16a (0.0081 wt. %) is introduced at 30° C. The mixture obtained is stirred for 1 minute, is heated up to a temperature of 260° C. and is held at this temperature for 30 minutes, and thereafter is cooled down to room temperature. As a result, a hard material is obtained that is characterized by the following parameters: Tg (A), compression strength (A) and swelling (A).

Example 24

In a separate vessel, a solution containing dicyclopentadiene, polymer stabilizers 1010 (0.20 wt. %), 168 (0.50 wt. %) and 292 (0.50 wt. %), and methacrylates EGDMA (1.00 wt. %) and BGDMA (5.0 wt. %) is prepared. The mixture is heated in an autoclave to 150° C., is held at the specified temperature for 240 minutes, and is cooled down to room temperature. Radical initiators B (1.0 wt. %) and 30 (2.0 wt. %) are introduced into the mixture obtained. Catalyst N17a (0.0083 wt. %) is introduced at 20° C. The mixture obtained is stirred for 5 minutes, is heated up to a temperature of 340° C. and is held at this temperature for 10 minutes, and thereafter is cooled down to room temperature. As a result, a hard material is obtained that is characterized by the following parameters: Tg (A), compression strength (B) and swelling (A).

Example 25

In a separate vessel, a solution containing dicyclopentadiene, polymer stabilizers 14 (0.40 wt. %), 168 (0.80 wt. %)

and 770 (0.40 wt. %), and methacrylates BGDMA (2.00 wt. %) and HPMA (1.0 wt. %) is prepared. The mixture is heated in an autoclave to 220° C., is held at the specified temperature for 15 minutes, and is cooled down to room temperature. Radical initiator BC-FF (1.0 wt. %) is introduced into the mixture obtained. Catalyst N18a (0.0133 wt. %) is introduced at 10° C. The mixture obtained is stirred for 5 minutes, is heated up to a temperature of 200° C. and is held at this temperature for 30 minutes, and thereafter is cooled down to room temperature. As a result, a hard material is obtained that is characterized by the following parameters: Tg (C), compression strength (B) and swelling (C).

Example 26

In a separate vessel, a solution containing dicyclopentadiene, polymer stabilizers 702 (0.40 wt. %) and 327 (0.20 wt. %), and methacrylate EGDMA (5.00 wt. %) is prepared. The mixture is heated in an autoclave to 150° C., is held at the specified temperature for 60 minutes, and is cooled down to room temperature. Radical initiator BC-FF (1.0 wt. %) is introduced into the mixture obtained. Catalyst N4a (0.0123 wt. %) is introduced at 25° C. The mixture obtained is stirred for 10 minutes, is heated up to a temperature of 200° C. and is held at this temperature for 30 minutes, and thereafter is cooled down to room temperature. As a result, a hard material is obtained that is characterized by the following parameters: Tg (C), compression strength (B) and swelling (C).

Example 27

In a separate vessel, a solution containing dicyclopentadiene, polymer stabilizers 330 (0.40 wt. %), 168 (0.50 wt. %) and 770 (0.50 wt. %), and methacrylate E2BADMA (3.00 wt. %) is prepared. The mixture is heated in an autoclave to 155° C., is held at the specified temperature for 300 minutes, and is cooled down to room temperature. Radical initiators BC-FF (1.0 wt. %) and 30 (1.0 wt. %) are introduced into the mixture obtained. Catalyst N20a (0.0051 wt. %) is introduced at 15° C. The mixture obtained is stirred for 10 minutes, is heated up to a temperature of 255° C. and is held at this temperature for 30 minutes, and thereafter is cooled down to room temperature. As a result, a hard material is obtained that is characterized by the following parameters: Tg (A), compression strength (B) and swelling (A).

Example 28

In a separate vessel, a solution containing dicyclopentadiene, polymer stabilizers 5057 (0.40 wt. %), TNPP (0.80 wt. %), and methacrylate BGDMA (1.00 wt. %) is prepared. The mixture is heated in an autoclave to 155° C., is held at the specified temperature for 300 minutes, and is cooled down to room temperature. Radical initiator B (2.0 wt. %) is introduced into the mixture obtained. Catalyst N1b (0.0068 wt. %) is introduced at 30° C. The mixture obtained is stirred for 10 minutes, is heated up to a temperature of 200° C. and is held at this temperature for 120 minutes, and thereafter is cooled down to room temperature. As a result, a hard material is obtained that is characterized by the following parameters: Tg (C), compression strength (B) and swelling (B).

Example 29

In a separate vessel, a solution containing dicyclopentadiene, polymer stabilizers 354 (1.00 wt. %) and 770 (0.50 wt. %), and methacrylate BGDMA (8.00 wt. %) is prepared. The mixture is heated in an autoclave to 155° C., is held at the specified temperature for 300 minutes, and is cooled down to room temperature. Radical initiators BC-FF (1.0 wt. %) and 30 (1.0 wt. %) are introduced into the mixture obtained. Catalyst N2b (0.0064 wt. %) is introduced at 45° C. The mixture obtained is stirred for 10 minutes, is heated up to a temperature of 275° C. and is held at this temperature for 30 minutes, and thereafter is cooled down to room temperature. As a result, a hard material is obtained that is characterized by the following parameters: Tg (B), compression strength (B) and swelling (A).

Example 30

In a separate vessel, a solution containing dicyclopentadiene, polymer stabilizers 702 (0.37 wt. %), 168 (0.73 wt. %) and 770 (0.37 wt. %), and methacrylate EGDMA (1.00 wt. %) is prepared. The mixture is heated in an autoclave to 165° C., is held at the specified temperature for 240 minutes, and is cooled down to room temperature. Radical initiator BC-FF (1.0 wt. %) is introduced into the mixture obtained. Catalyst N4b (0.0093 wt. %) is introduced at 30° C. The mixture obtained is stirred for 10 minutes, is heated up to a temperature of 210° C. and is held at this temperature for 60 minutes, and thereafter is cooled down to room temperature. As a result, a hard material is obtained that is characterized by the following parameters: Tg (C), compression strength (B) and swelling (C).

Example 31

In a separate vessel, a solution containing dicyclopentadiene, polymer stabilizers 703 (0.45 wt. %) and 770 (0.45 wt. %), and methacrylate TMPTMA (1.00 wt. %) is prepared. The mixture is heated in an autoclave to 155° C., is held at the specified temperature for 280 minutes, and is cooled down to room temperature. Radical initiators BC-FF (1.0 wt. %) and 30 (1.5 wt. %) are introduced into the mixture obtained. Catalyst N5b (0.0130 wt. %) is introduced at 30° C. The mixture obtained is stirred for 10 minutes, is heated up to a temperature of 260° C. and is held at this temperature for 30 minutes, and thereafter is cooled down to room temperature. As a result, a hard material is obtained that is characterized by the following parameters: Tg (A), compression strength (B) and swelling (A).

Example 32

In a separate vessel, a solution containing dicyclopentadiene, polymer stabilizers 1010 (0.37 wt. %), 168 (0.10 wt. %) and 770 (0.47 wt. %), and methacrylates HEMA (2.50 wt. %) and GMA (5.0 wt. %) is prepared. The mixture is heated in an autoclave to 155° C., is held at the specified temperature for 280 minutes, and is cooled down to room temperature. Radical initiators BC-FF (1.0 wt. %) and 30 (1.0 wt. %) are introduced into the mixture obtained. Catalyst N1c (0.0106 wt. %) is introduced at 20° C. The mixture obtained is stirred for 5 minutes, is heated up to a temperature of 310° C. and is held at this temperature for 5 minutes, and thereafter is cooled down to room temperature. As a result, a hard material is obtained that is characterized by the following parameters: Tg (A), compression strength (B) and swelling (A).

Example 33

In a separate vessel, a solution containing dicyclopentadiene and methacrylates TCDDMA (5.00 wt. %) and EGDMA (1.00 wt. %) is prepared. The mixture is heated in an autoclave to 155° C., is held at the specified temperature for 240 minutes, and is cooled down to room temperature. Radical initiators BC-FF (1.0 wt. %) and 30 (1.0 wt. %), and polymer stabilizers 330 (0.20 wt. %), 168 (0.50 wt. %) and 770 (0.50 wt. %) are introduced into the mixture obtained. Catalyst N2 (0.0121 wt. %) is introduced at 25° C. The mixture obtained is stirred for 10 minutes, is heated up to a temperature of 270° C. and is held at this temperature for 40 minutes, and thereafter is cooled down to room temperature. As a result, a hard material is obtained that is characterized by the following parameters: Tg (A), compression strength (B) and swelling (A).

Example 34

In a separate vessel, a solution containing dicyclopentadiene and methacrylates TCDDMA (8.00 wt. %) and TMPTMA (2.0 wt. %) is prepared. The mixture is heated in an autoclave to 180° C., is held at the specified temperature for 180 minutes, and is cooled down to room temperature. Radical initiator BC-FF (2.5 wt. %), and polymer stabilizers 1010 (0.3 wt. %) and 168 (0.45 wt. %) are introduced into the mixture obtained. Catalyst (0.0165 wt. %) is introduced at 25° C. The mixture obtained is stirred for 10 minutes, is heated up to a temperature of 170° C. and is held at this temperature for 30 minutes, and thereafter is cooled down to room temperature. As a result, a hard material is obtained that is characterized by the following parameters: Tg (C), compression strength (B) and swelling (B).

Example 35

In a separate vessel, a solution containing dicyclopentadiene, polymer stabilizers 1010 (1.50 wt. %), TNPP (1.00 wt. %) and 123 (1.50 wt. %), and methacrylates AMA (0.50 wt. %) and TCDDMA (12.00 wt. %) is prepared. The mixture is heated in an autoclave to 170° C., is held at the specified temperature for 60 minutes, and is cooled down to room temperature. Radical initiators B (2.0 wt. %) and 30 (2.0 wt. %) are introduced into the mixture obtained. Catalyst N3a (0.0236 wt. %) is introduced at 25° C. The mixture obtained is stirred for 10 minutes, is heated up to a temperature of 260° C. and is held at this temperature for 40 minutes, and thereafter is cooled down to room temperature. As a result, a hard material is obtained that is characterized by the following parameters: Tg (A), compression strength (B) and swelling (A).

Example 36

In a separate vessel, a solution containing dicyclopentadiene, polymer stabilizers 1010 (0.20 wt. %), 168 (0.40 wt. %) and 770 (0.40 wt. %), and methacrylate E2BADMA (12.00 wt. %) is prepared. The mixture is heated in an autoclave to 150° C., is held at the specified temperature for 240 minutes, and is cooled down to room temperature. Radical initiators BC-FF (1.0 wt. %) and TPM (1.0 wt. %) are introduced into the mixture obtained. Catalyst N10a (0.0063 wt. %) is introduced at 5° C. The mixture obtained is stirred for 10 minutes, is heated up to a temperature of 270° C. and is held at this temperature for 30 minutes, and thereafter is cooled down to room temperature. As a result, a hard material is obtained that is characterized by the following parameters: Tg (C), compression strength (A) and swelling (B).

Comparative Example

In a separate vessel, a solution containing dicyclopentadiene and polymer stabilizers 1010 (0.4 wt. %), 168 (0.4 wt. %) and 770 (0.4 wt. %) is prepared. Catalyst N1 (0.0106 wt. %) is introduced at 35° C. The mixture obtained is stirred for 5 minutes, is heated up to a temperature of 200° C. and is held at the specified temperature for 35 minutes, and thereafter is cooled down to room temperature. As a result, a hard material is obtained that is characterized by the following parameters: Tg 161° C. (D), compression strength 65 MPa (D) and swelling 20% (D).

INDUSTRIAL APPLICABILITY

As it is evident from the Examples, the present material considerably exceeds polydicyclopentadiene in respect of all primary physical and mechanical properties, and suits the best for the proppant production.

The invention claimed is:
1. A polymer material for proppant, said material comprising a metathesis-radically cross-linked mixture of oligocyclopentadienes and methylcarboxy norbornene esters, wherein the oligocyclopentadienes comprise trimers of cyclopentadiene and tetramers of cyclopentadiene.
2. A method for producing the polymer material for proppant according to claim 1, said method including producing the mixture of oligocyclopentadienes and methylcarboxy norbornene esters by mixing dicyclopentadiene with methacrylic esters and with polymer stabilizers which are the following compounds or mixtures thereof: tetrakis[methylene-(3,5-di-tert-butyl-4-hydroxyhydrocinnamate)]methane, 2,6-di-tert-butyl-4-(dimethylamino) phenol, 1,3,5-trimethyl-2,4,6-tris(3,5-di-tert-butyl-4-hydroxybenzyl)benzene, tris(4-tert-butyl-3-hydroxy-2,6-dimethylbenzyl)isocyanurate, 3,5-di-tert-butyl-4-hydroxyanisole, 4,4'-methylene-bis (2,6-di-tert-butylphenol), diphenylamine, para-di-tert-butyl-phenylenediamine, N,N'-diphenyl-1,4-phenylenediamine, tris(2,4-di-tert-butylphenyl)phosphite, tris(nonylphenyl) phosphite, bis(2,2,6,6-tetramethyl-4-piperidinyl)sebacate, bis(1-octyloxy-2,2,6,6-tetramethyl-4-piperidinyl)sebacate, bis(1-methyl-2,2,6,6-tetramethyl-4piperidinyl)sebacate, 2-tert-butyl-6-(5-chloro-2H-benzotriazole-2-yl)-4-methylphenol, 2-(2H-benzotriazole-2-yl)-4,6-bis(1-methyl-1-phenyl)phenol; heating the initial mixture up to a temperature of 150-220° C. and holding at this temperature for 15-360 minutes, followed by cooling down to 20-50° C.; successively introducing, into the resultant mixture of oligocyclopentadienes and methylcarboxy norbornene esters, a radical initiator which includes one or more of the following compounds or mixtures thereof: di-tert-butyl peroxide, dicumyl peroxide, 2,3-dimethyl-2,3-diphenylbutane, triphenylmethane, and a catalyst which is a compound of the following general formula:

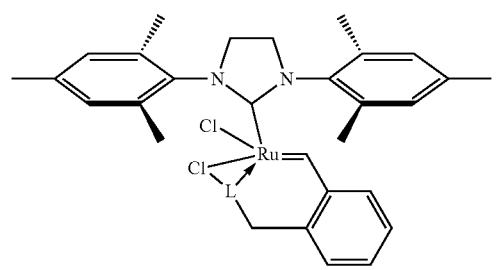

where the substituent L is selected from the following group:
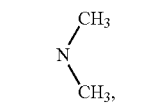 N1
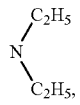 N2
 N3
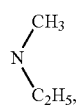 N4
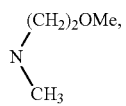 N5
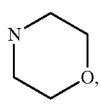 N5b
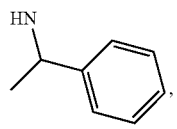 N1a
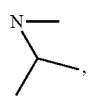 N6a
 N11a
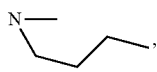 N16a
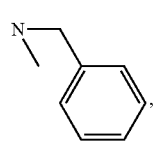 N1b
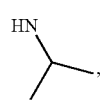 N2a
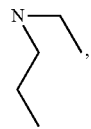 N7a
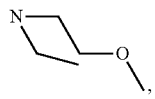 N12a
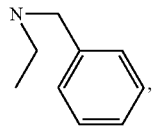 N17a
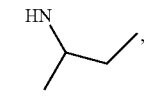 N2b
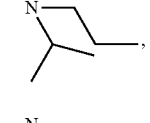 N3a
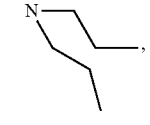 N8a
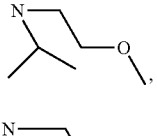 N13a
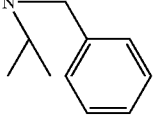 N18a
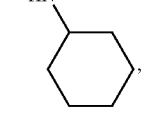 N3b
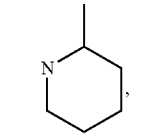 N4a
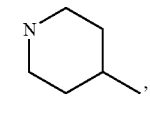 N9a
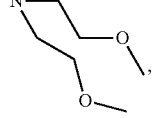 N14a

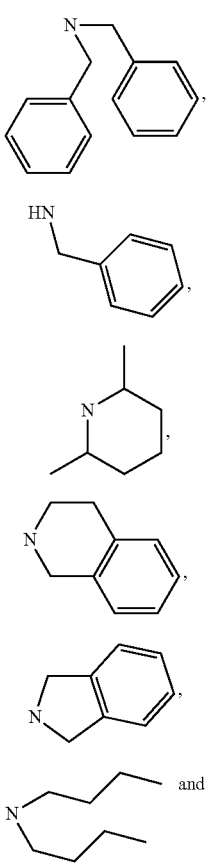

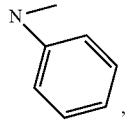

wherein the polymeric matrix produced is heated up to a temperature of 50-340° C. and is held at this temperature for 1-360 minutes, and thereafter is cooled down to room temperature.

3. The method according to claim 2, characterized in that the components of the polymeric matrix are present in the following amounts, wt. %:

the polymer stabilizers: 0.1-3;
the radical initiators: 0.1-4;
the catalyst: 0.002-0.02;
the mixture of oligocyclopentadienes and methylcarboxy norbornene esters being the balance.

4. The method according to claim 2, characterized in that the following compounds or mixtures thereof are used as the methacrylic esters: allyl methacrylate, glycidyl methacrylate, ethylene glycol dimethacrylate, diethylene glycol dimethacrylate, butylene glycol dimethacrylate, 2-hydroxyethyl methacrylate, 2-hydroxypropyl methacrylate, tricyclodecane dimethanol dimethacrylate, ethoxylated bisphenol A dimethacrylate, trimethylolpropane trimethacrylate.

5. A polymer material for proppant, said material consisting of a metathesis-radically cross-linked mixture of oligocyclopentadienes and methylcarboxy norbornene esters.

6. A proppant comprising the polymer material of claim 1.

* * * * *